United States Patent
Rappoport et al.

(10) Patent No.: US 7,087,708 B2
(45) Date of Patent: Aug. 8, 2006

(54) POLY ((POLYTHIOALKYL)ESTERS), THEIR APPLICATIONS AND DERIVATIVES

(75) Inventors: Leonid Rappoport, Mountain View, CA (US); Aleksander Yam, Sunnyvale, CA (US); Alex Vainer, Fremont, CA (US)

(73) Assignee: Polymeright, Inc., Fremont, CA (US)

( * ) Notice: Subject to any disclaimer, the term of this patent is extended or adjusted under 35 U.S.C. 154(b) by 0 days.

(21) Appl. No.: 10/826,216

(22) Filed: Apr. 16, 2004

(65) Prior Publication Data

US 2004/0230030 A1  Nov. 18, 2004

Related U.S. Application Data

(60) Provisional application No. 60/463,123, filed on Apr. 17, 2003.

(51) Int. Cl.
*C08G 75/14* (2006.01)
*C07C 321/14* (2006.01)

(52) U.S. Cl. .......................... 528/373; 568/22
(58) Field of Classification Search ............... 528/373; 568/22

See application file for complete search history.

(56) References Cited

U.S. PATENT DOCUMENTS

| | | | | |
|---|---|---|---|---|
| 1,422,869 A | * | 7/1922 | Kranzlein et al. ............ 558/26 |
| 2,221,418 A | * | 11/1940 | Weihe ........................ 528/294 |
| 2,582,605 A | | 1/1952 | Richter et al. ................. 568/22 |
| 3,386,963 A | | 6/1968 | Santaniello et al. .......... 528/74 |
| 4,124,645 A | | 11/1978 | Bertozzi ........................ 568/22 |
| 4,131,716 A | | 12/1978 | Bertozzi ................... 428/424.4 |
| 4,764,299 A | | 8/1988 | Salomon ...................... 508/570 |
| 5,342,724 A | * | 8/1994 | Wilson ........................ 430/114 |
| 5,407,972 A | * | 4/1995 | Smith et al. .................. 522/96 |
| 6,114,485 A | | 9/2000 | Kobayashi et al. ......... 526/289 |
| 6,383,324 B1 | | 5/2002 | Vietti et al. ................. 156/107 |
| 2001/0036987 A1 | * | 11/2001 | Beekman et al. ........... 524/301 |

OTHER PUBLICATIONS

Kharasch, N. "Organic Sulfur Compounds" (1961) vol. 1:269-270.

* cited by examiner

Primary Examiner—Jeffrey B. Robertson
(74) Attorney, Agent, or Firm—Lumen Intellectual Property Services, Inc.

(57) ABSTRACT

Compounds and polymers of such compounds are prepared based on the reaction product of a polysulfide containing diol and a dibasic acid, conveniently using an acid catalyst for the reaction. By appropriate choice of mole ratios, the resulting compound may have a hydroxyl and carboxyl, two hydroxyls or two carboxyls as terminal groups. The compounds can be modified by adding augmenting groups to change the terminal groups or properties of the monomer. The polymers find advantageous use as adhesives, sealants, coatings, paints, elastomers, plastic formulations, fibers, films and molded objects.

1 Claim, No Drawings

POLY ((POLYTHIOALKYL)ESTERS), THEIR APPLICATIONS AND DERIVATIVES

CROSS-REFERENCE TO RELATED APPLICATIONS

This application claims priority to provisional application Ser. No. 60/463,123, filed Apr. 17, 2003.

BACKGROUND

1. Technical Field

The field of this invention is polysulfur-containing polymeric ester compositions and their polymers.

2. Background of the Invention

Despite the mature nature of the field of polymers, there remain many opportunities to create polymers having novel properties and applications. Polymers may be divided into addition polymers and condensation polymers. Among the condensation polymers are polyesters, polyethers, polyurethanes, polyamines, and polyanhydrides. These polymers find wide application in areas of molded products, lubricants, sealants, coatings, paints, elastomers, films, fibers, elastomers and other formulations. Their properties vary widely depending upon the functional groups employed, both as to nature and diversity, the backbone units, the functionalities in the backbone, the molecular weight and homogeneity of molecular weight range of the polymeric molecules, and the like. Because of the great diversity of properties of the polymers, there can be numerous customized applications for the polymers, where the properties of the polymers are customized to a particular need.

Polymers containing polythioalkyl groups have not found extensive employment in the polymeric field, with the exception of the Thiokol® polymers that currently are not widely used due to environmental concerns. Yet, the presence of sulfur in the polymers can have desirable properties. Some polymeric products containing polysulfide linkages have been reported for a variety of purposes, such as polymers having disulfide and ether groups, disulfide and carbamate groups, and disulfide and acetal groups in the polymer backbone. There have been reports of other polymeric compositions, where the disulfide is in a side chain of the polymer, as in addition polymers of acrylics. While specific compounds having sulfides having greater than one sulfur are disclosed in the literature, for the most part they are not exemplified in the experimental work. Specifically, there have been no reports of polymers employing a monomeric unit of a polysulfide functionality in the backbone and formed from a combination of a polysulfide-containing diol and a dibasic acid.

Relevant Literature

Ethers of di(hydroxyethyl)sulfide and -disulfide are reported in U.S. Pat. No. 2,582,605. Polymers of alkyldisulfides terminating in hydroxyl groups and further reacted with polyurethanes are reported in U.S. Pat. No. 3,386,963. Polymers of polymerized thiodiglycol reacted to provide terminal halide groups which are then further reacted with sodium polysulfide to form a latex dispersion are reported in U.S. Pat. No. 4,124,645. Polymers of polymerized sulfide and polysufide glycols terminated with mercaptans are reported in U.S. Pat. No. 4,764,299. U.S. Pat. No. 6,383,324 reports the polymerization of a "randomly copolymeric polyacetal of a dithiodialkylene glycol" with polyisocyantes. Sulfur substituted acrylic polymers are reported in U.S. Pat. Nos. 4,131,716 and 6,114,485.

SUMMARY OF THE INVENTION

Compositions are provided comprising the condensation product of two compounds: a dibasic acid, or its anhydride and a di(hydroxysubstituted organic group)polysulfide, where the compositions have one or a plurality of units consisting of the combination of the two compounds. The compositions are formed by combining the compounds under selected acidic conditions and at a mole ratio to provide the desired product. The compositions resulting from the reaction will usually be a mixture in the absence of a large excess of one of the reactants, unless special conditions to prevent oligomerization are employed. Depending on the ratios of the two reactants the majority of molecules in the composition may have one hydroxyl and one carboxyl as terminating groups, or two hydroxyls or two carboxyls. All of these compounds may react with a wide variety of polyfunctional compounds to provide products having properties applicable for specific end purposes.

DESCRIPTION OF THE SPECIFIC EMBODIMENTS

In accordance with the subject invention, compositions are produced using a combination of a polysulfide-containing diol and a dibasic carboxylic acid. The products have polysulfide and ester linkages in their backbone. Each of the molecules will have at least one unit that includes one oxy group, one carbonyl group, one organic ester group, a polysulfide group, and will have at least 5, usually at least 6 carbon atoms, more usually at least 8 carbon atoms and not more than about 80 carbon atoms, usually not more than about 60 carbon atoms, more usually not more than about 46 carbon atoms. The sulfur atoms will be at least about 2 carbon atoms from an oxygen atom.

Products comprising the units can be prepared by combining the two reactants, desirably in the presence of acid, at an elevated temperature and removing water as formed. Depending on the conditions, products may be prepared using about 1:1 mole ratios of reactants and having predominantly hydroxyl and carboxyl groups at the termini, where the products are homopolymers or oligomers generally having more than about two units and having molecular weights of 5000 dal or more, or using mole ratios between greater than 1:1 and 1:2 and having predominantly terminal hydroxyl groups or carboxyl groups. As indicated above, by using special conditions or large excesses of one of the reactants a more homogeneous composition may be obtained where the ratio of the reactants is 1:2 and has a defined composition.

In referring to a homopolymers or homopolymers, it is intended that the combination of one di(hydroxysubstituted organic group) and one dibasic acid form a repetitive unit and the molecules will have both hydroxyl and carboxyl termini. An "extended monomeric" unit will have a ratio between greater than 1:1 and up to 1:2 of the two reactants, so that there will be a majority of terminal groups of the same functionality, where extended monomeric unit molecules can be employed as monomers. Particularly with co-polymers, the extended monomer will be preferred to correspond to monomers having a plurality of the same functionality.

Where the composition is formed from the reactants in a mole ratio of its reactants of between about 1:1 and up to and including 2:1 or even greater, and has molecular weight below about 5000 dal, it is referred to as "extended monomer;" the extended monomer will have one of the following formulae:

(a) $MF_mORS_nR^1OM^1$; or (b) $MZAORS_nR^1F^1{}_mOAZ^1M^1$, wherein

O and S have their normal meaning of oxygen and sulfur;

n is at least 2 and not more than about 8, usually in the range of about 2 to 4, more usually in the range of 2 to 3;

F is of the formula $—ORS_nR^1OA-$;

$F^1$ is of the formula $—OAORS_nR^1—$;

m is at least 1;

Z and $Z^1$ are oxy or amino;

M and $M^1$ are the same or different and are hydrogen when only a dibasic acid and a di(hydroxysubstituted organic group)polysulfide are reacted, or an organic substituent bonded to oxygen to form an ether or ester as appropriate or nitrogen to form a substituted amino or amide, when with a single group it is referred to as an "augmented extended monomer"; and the remaining symbols are as defined previously.

The extended monomers and augmented monomers can be used to form homo- or copolymers (of the extended monomers, only the hydroxyl terminal extended monomers can be used to form homopolymers).

R and $R^1$ may be ethylene, propylene, isopropylene, butylene, hexylene, hexenylene, butynylene, etc.

Preferred polysulfide diol compounds are aliphatic, where R and $R^1$ are dialkylene of from 2–12, usually 2 to 6 carbon atoms, particularly polymethylene, or methyl or ethyl substituted polymethylene. Preferably, the hydroxyl group is from 2 to 3 carbon atoms from the polysulfide group.

Examples of A include carbonyl dioyl, (carbonic acid; particularly when in a 1:2 mole ratio to the diol) oxaldioyl, malondioyl, succindioyl, pimeldioyl, adipdioyl, sebacdioyl, maledioyl, phthaldiolyl, terephthaldioyl, dimers of fatty acids (particularly fatty acids of from 16 to 18 carbon atoms), oxy(bis-acetyl), N-methyl amino(bis-propionyl), 1,4-cyclohexane diacetyl, etc. Preferred A groups are aliphatic, may be saturated or unsaturated, straight chain or branched and may have 0 to 2 heteroatoms, such as oxygen, nitrogen and sulfur.

Z and $Z^1$ are the same or different and will be for the most part oxy or —NH—, but may be a substituted amino having an alkyl group of from 1 to 6, usually 1 to 2 carbon atoms.

When M and $M^1$ are other than hydrogen, that is, define the "augmented extended monomer," then M is defined as $WR^2—$ and M is defined as $W^1R^3—$, wherein:

$R^2$ and $R^3$ are the same or different and organic divalent radicals, normally terminating in carbon atoms, of 1 to 20 carbon atoms, usually 2 to 12 carbon atoms, which may be aliphatic, alicyclic, aromatic, heterocyclic (usually having from 1–3, more usually 1–2, annular heteroatoms, that are oxygen, nitrogen and sulfur) or combinations thereof, usually aliphatic, substituted or unsubstituted, straight or branched chain, aliphatically saturated or unsaturated, usually having no more than three, more usually no more than two sites of aliphatic unsaturation, e.g. double or triple bond, conjugated or unconjugated, where substituents not participating in the reaction to form the augmented monomer will be inert to the reactions of preparation of the augmented monomers and may be inert to the polymerization reactions, being organic or inorganic substitutions, containing heteroatoms such as oxygen, nitrogen, sulfur, phosphorous, silicon, boron, etc., comprising such groups as oxy (ether), thio (usually ether), cyano, amino and substituted amino, I°, II°, III° and IV°, halo, azo, etc., oxo-carbonyl (keto, aldehyde), non-oxo-carbonyl (carboxylic acid, ester and amide) phosphoryl, phosphonyl, silicyl, boronyl, etc., there usually being not more than about 4 heterosubstituents, more usually not more than about 2 heterosubstituents, generally having from 2 to 12, more usually 2 to 6 carbon atoms, and from 0 to 8, more usually 0 to 6, generally 0 to 4 heteroatoms; generally being aliphatic of from 2 to 6 carbon atoms, particularly polymethylene or methyl or ethyl substituted polymethylene; and W and $W^1$ are the same or different, usually the same, and are amino, including primary and secondary amino of from about 1 to 6, usually about 1 to 4 carbon atoms, hydroxyl, carboxyl, isothiocyanate, isocyanate, oxo-carbonyl, non-oxy-carbonyl, siloxane, silane, cyclocarbonate, active olefin, e.g. acrylyl, methacrylyl, allyl, vinyl, e.g. vinyl ether, active halo, and the like.

Compounds that can be used to further augment the size of the extended monomers include diamines, such as propylene diamine, N-methyl butylenediamine, N-aminoethylpiperazine, 1,1-dimethyl-1,4-diaminobutane, trimethylhexamethylenediamine, 2-methylpentamethylenediamine, aziridine, oxirane, glycidyl alcohol, diols, such as diethylene glycol, tripropylene glycol, catechol, hydroquinone, various dihydroxyalkyl polysulfides, glycolic, acrylic and methacrylic acids, hydroxyethyl acrylate and methacrylate, N-hydroxypropyl acrylamide, di(hydroxybutyl) diethyl siloxane, allyl alcohol, glycerol carbonate, chloroacetic acid, acrylic acid, dihydroxyacetone, 4,4-di(hydroxymethyl)butyric acid, etc.

The extended monomers and the polymers of the basic unit of the polysulfide diol and dibasic acid may be prepared by combining the two reactants in the appropriate mole ratio, depending upon which monomer is desired and whether terminal hydroxyl or terminal carboxyl groups are desired. The polysulfide diol and diacid or anhydride are combined in the appropriate ratio, conveniently in the absence of a solvent and in the presence of an acid catalyst, and heated to an elevated temperature above about 90° C., generally in the range of about 100 to 180° C., while removing the water from the reaction mixture. Water can be removed conveniently by employing a mild vacuum, from about 1–20 mm Hg. Any convenient acid catalyst may be employed, although it is found that for some combinations, one catalyst is preferred over another. For the most part, sulphonic acid catalysts find use, particularly methane sulfonic acid, although p-toluene sulphonic acid may also be used. Other catalysts include zeolites, Lewis acids, acidic diatomaceous earths, etc. The amount of catalyst will generally be in the range of about 0.01 to 2 wt % of the reactants. In some instances, mixtures of the diol may be employed, where the polysulfide may be a mixture of polysulfides having differing numbers of sulfurs. For example, the commercially available DiHEDS (Chevron Phillips Chemicals LP, regular grade) comprises 95–97% di(hydroxyethyl)disulfide and 3–5% of higher polysulfides, mainly the trisulfide.

The high molecular weight poly(thioesters) have the formula:

$Xf_mOX^1$ wherein:

f is the group —ORS$_n$R$^1$—;

X is H or HOA-;

X$^1$ is H or —RS$_n$R$^1$OH;

m is in the range of about 2 to 100, usually in the range of about 2 to 60, more usually in the range of about 4 to 50; and the remaining symbols are as defined previously.

These polymers can be produced when the molar ratio between dibasic acid and a di(hydroxysubstituted organic group)polysulfide is close to 1:1, or equals 1:1.

The subject monomers may be reacted with difunctional compounds having the same or different functionalities, where the difunctional compounds will generally be of at least about 2 carbon atoms, usually when a monomer of from about 2 to 12, more usually 2 to 6 carbon atoms and usually having only two reactive functionalities, although up to 4 reactive functionalities may be present if one wishes to have cross-linking, or 1000 or more carbon atoms, usually not more than about 500 carbon atoms when one wishes prepolymers. Common reagents include glycolic acid, where a terminal hydroxyl may be exchanged for a carboxyl functionality or a terminal carboxyl functionality may be extended retaining the carboxyl functionality. Therefore, by appropriate choice, one may vary the terminal functionalities depending upon the comonomer that one wishes to use for the copolymerization. Functionalities for reacting with the monomer may include active halogen, hydroxyl, and carboxy, while the terminal functionality may include active halogen, non-oxo- and oxo-carbonyl, hydroxyl, amino, e.g. primary and secondary, silyl, siloxanyl, etc. For cross-linking, combinations of hydroxyl, carboxyl, amino, etc. functionalities may be employed, having at least about 3 and not more than about 5 reactive functionalities.

The polymers of the extended monomers and augmented monomers may be generally depicted with the following formula:

wherein:

T and T$^1$ are the same or different and are the terminal groups of the polymer derived from one of the comonomers;

one of E and D is a subject extended and/or augmented monomeric unit, and the other is the comonomer; and r will be at least 2, generally on the average at least about 5 and usually not more than about 1000, more usually not more than about 500, generally not more than about 100.

The polymers that are prepared will have at least one extended and/or extended augmented monomeric unit, generally at least two of such units, and may have 500 or more of such units, depending upon the nature of the polymer. One group of polymers of particular interest are polymers that have from about 2 to 100, more usually about 5 to 50 total monomeric units, coming from both the subject extended monomers and the comonomers. The same or different subject extended monomers may be used and the polymers may include block copolymers, alternating copolymers, cross-linked copolymers, etc. The comonomer may be a small di- or higher functionality molecule of less than about 500 dal, may be an oligomer of 2 or more units, usually not more than about 100 units, or any other organization of monomers to provide the second member of the copolymer. As indicated above, one may have a condensation polymer where the subject monomers are in the backbone of the polymer or may be joined to a monomer that can undergo addition polymerization, where the subject monomer would be a side chain or a cross-linker for the polymer.

A variety of second monomers can be employed to provide the polymeric products of this invention. One important group of compounds is polyisocyanates to form polyurethanes. Illustrative polyisocyanates include 2,4- and 2,6-toluene diisocyanate, isophorone diisocyanate, trimethylhexamethyleneisocyanate, 3,3'-dimethoxy-4,4'-biphenylene diisocyanate, naphthalene-1,5-diisocyanate, hexamethylene diisocyanate, 1,4-phenylene diisocyanate, etc. Illustrative patents concerning diisocyanates are U.S. Pat. Nos. 4,032,468; 5,043,398 and 5,098,788 and the references cited therein, are specifically incorporated herein by reference and are only illustrative of the large patent literature concerning the use of polyisocyanates with a wide variety of comonomers for a diverse group of utilities.

The polyurethanes can be prepared from hydroxy-terminated extended monomers by their reaction with polyisocyanates, and from isocyanate-augmented expended monomers by the reactions with conventional polyol and polyamine chain extenders and crosslinkers in accordance with conventional ways as described in the references cited above and other references present in the literature. Generally, the reaction takes place at temperatures in the range of about 20 to 150° C. in the presence of typical catalysts of an isocyanate reaction, which are known to persons skilled in the art. The ratio of NCO to OH should be chosen depending on the targeted properties of the produced material: if the goal is to produce a hard polyurethane plastic, or polyurethane elastomer, the NCO/OH ratio should be close to 1:1. If the goal is to produce a curable reactive resin or prepolymer, the ratio should be higher. The time of the reaction will vary depending upon the nature of the reactants, generally not exceeding several hours.

Also important are products generated when the carboxyl and hydroxyl-terminated extended monomers and augmented monomers are polymerized through the reactions of polyetherification, polyesterification and polyamidation, where the hydroxyl or carboxyl groups of the monomer may react with amine or hydroxyl groups of a polyfunctional co-reactant, forming a polymer with amide, ether and ester links. In this way, polymers can be prepared having a variety of physical and chemical properties. The comonomers in these reactions are polyamines, polyethers or combinations thereof, where the comonomers may be di- or higher order, being aliphatic, alicyclic, aromatic or combinations thereof, substituted or unsubsituted, the substituents normally being inert in the polymerization, such as ethers, esters, amides, cyano, stable halo, e.g. bonded to an annular aromatic carbon, etc., or may be heterocyclopropanes, i.e. aziridine, oxirane and substituted derivatives thereof, where the subsituent will usually be alkyl. Thus, comonomers may be exemplified by ethylene glycol, propylene glycol, polyethylene glycol, di(hydroxyethyl)amine, di(aminoethyl)ether, N-methyl di(aminoethyl)ether, di(hydroxyethyl)sulfide or disulfide, hydroquinone, catechol, 1,4-diaminocyclohexane, 1,4-phenylenediamine, etc. The comonomers will have from about 2 to 20, more usually from about 2 to 12 carbon atoms and from 2 to 7, usually 2 to 5 heteroatoms, which will for the most part be N, S and O.

Instead of the condensation polymers described above, the subject monomers may be modified to be used in addition polymers. By modifying a hydroxyl or carboxyl group to add an addition polymerizable olefinic group, one can provide products that can serve as addition polymerizable monomers where only one olefinic group is added or as cross-linking agents, where two olefinic groups are added. In the latter case, by copolymerizing with a different addition polymerizable monomer, one can provide a polymer that is reversibly cross-linked. By reducing a disulfide linkage, the cross-linking will be cleaved, while with oxidation the disulfide will be restored and the cross-link reestablished.

Any convenient addition polymerizable compound can be employed that will react with a hydroxyl group or carboxyl group of the subject extended monomers and with the same functionalities as well as amino groups of the subject augmented monomers. Thus any active ethylene group that has an available hydroxyl, carboxyl or amino group for reaction can be employed. For example, the acrylic acids, hydroxysubstituted active ethylene groups, e.g. hydroxyethoxyethylene, aminoethoxyethylene, aminoethyl acrylate, hydroxyethyl acrylamide, etc. Common addition polymerizable monomers useful as comonomers include the acrylic acids, such as acrylic acid, methacrylic acid, _-chloroacrylic acid, ethyl acrylate, acrylamide, etc., vinyl compounds, such as hydroxyethyl vinyl ether, carboxyethyl vinyl ether, vinyl glycolate, allyl alcohol, etc., and polyenes, such as 2-hydroxymethyl butadiene, carboxymethyl butadiene, p-carboxystyrene, etc.

The polymers may be formulated in conventional ways. Common additives include plasticizers, extenders, UV absorbers, stabilizers, release agents, etc. These additives are used based on the nature of the polymer in conventional amounts or reduced amounts based on the properties provided by the subject monomers.

These compounds will be prepared in accordance with conventional ways, where esters can be prepared with carbodiimides, mixed anhydrides, or acid, as appropriate, with removal of water, and the like, under mild conditions, by combining the reactants in the appropriate mole ratio. The addition polymers may be polymerized under conventional conditions that are compatible with the presence of a polysulfide. Acid, metal ion or actinic radiation, optionally in conjunction with a photoinitiator, catalysis can find use. See, for example, U.S. Pat. No. 4,131,716.

While the above described polymers are the most common polymers, the subject monomers can also find use with such polymers as polyacetals, polyphosphate esters, alkyd polymers, polydienes, poly fatty acids, and the like.

The subject monomers can impart a large number of advantageous properties to the polymers employing the monomers. The subject monomers can enhance flexibility, low temperature properties, hydrophobicity, non-polar organic solvent resistance, affinity to metal surfaces, even rusty metal surfaces, weatherability, including ozone resistance, gas impermeability, resistance to UV radiation, mechanical properties and abrasion resistance, particularly in conjunction with polyisocyanate comonomers.

Due to the compatibility of the subject monomers, they can find use in polymers used as adhesives, sealants, coatings, elastomers, plastic formulations, molded products, fibers, hot melt adhesives, as additives and modifiers and independently as precursors to other reactive compounds. A variety of physical objects can be made having varying characteristics and properties from the polymers, using the subject polymers by themselves or in combination with other compatible polymers.

The following examples are offered by way of illustration and not by way of limitation,

EXPERIMENTAL

Example 1

Production of Carboxyl-Terminated poly(thioester) from di(hydroxyethyl)disulfide and Fatty Acid Dimer.

27 g of di(hydroxyethyl)disulfide (DiHEDS, produced by Chevron Phillips Chemicals LP, Regular grade) and 200 g dimer fatty acid dimer (CAS # 61788-89-4, Pripol-1013 from Uniqema, ICI Company) were combined in a jacketed reaction vessel and agitated. The molar ratio of components was 1:2. 0.2 g (0.05% of the total weight of raw materials) of p-toluenesulfonic acid monohydrate with 98% purity (CAS number 6192-52-5, obtained from Sigma-Aldrich) was used as a catalyst.

The esterification reaction proceeded at 125–130° C. (260–270° F.) for 3–4 hours with constant mixing. 10 mm Hg vacuum was applied in order to facilitate the removal of water from the reaction mixture.

For process control during this stage the concentration of carboxyl groups was monitored (ASTM D 465).

The process ended when the concentration of acid approached the calculated acid number of the carboxyl-terminated poly(dithioester), and no further distillate was formed. The acid number of the produced material equaled 83.6 mg KOH/g, while the projected acid number was 83.58. The produced material was a dark brown liquid with 6000 cPs viscosity.

Example 2

Production of Hydroxyl-Terminated poly(thioester) from di(hydroxyethyl)disulfide and Succinic Anhydride 308 g Di(hydroxyethyl)disulfide (DiHEDS CPChem L.L.C., Water-free grade) and 100 g of succinic anhydride (Sigma-Aldrich # 108-30-5) (molar ratio 1:2) were combined in a reaction vessel and heated to 120° C., followed by the addition of 4 g of catalyst, methanesulfonic acid (CAS number 75-75-2, Sigma-Aldrich). The system was mixed for 1 hr under 10 mm Hg vacuum and mixing continued at 120° C. until no more water was distilled from the reaction mixture.

For process control the concentration of carboxyl groups was monitored by ASTM D 465. At the end of the process the residual concentration of carboxyl groups was negligible. The produced substance was a clear yellowish viscous (2000 cPs) liquid, which later crystallized into a white hard waxy material.

Example 3

Production of Hydroxyl-Terminated poly(thioester) from di(hydroxyethyl)disulfide and Adipic Acid 600 g Di(hydroxyethyl)disulfide (DiHEDS CP Chem L.L.C. Water-free grade) and 474 g of adipic anhydride (Adipure by DuPont, CAS # 124-04-9) (molar ratio 6:5) were combined in a reaction vessel and 3.13 g of methanesulfonic acid (CAS number 75-75-2, Sigma-Aldrich) added. The mixture was heated to 120° C. with mixing for 1 hr, under 10 mm Hg vacuum and reaction maintained at 120° C. until no more water was distilled from the reaction mixture.

For process control the concentration of carboxyl groups was monitored by ASTM D 465. At the end of the process the residual concentration of carboxyl groups was negligible.

The produced substance was a clear yellowish viscous (~3000 cPs) liquid, which later crystallized into a white hard waxy material.

Example 4

Production of Hydroxyl-Terminated poly(thioester) from di(hydroxyethyl)disulfide, Adipic Acid and Dimethylolpropionic Acid.

300 g Di(hydroxyethyl)disulfide (DiHEDS CP Chem L.L.C. Water-free grade), 426 g of adipic acid, and 196 g of DMPA (GEO Specialty Chemicals, CAS # 4767-03-7) (molar ratio 4:6:3) were combined and heated at 160° C. with mixing for 2.5 hr, under 10 mm Hg vacuum. The temperature was increased to 180° C., and mixing continued at 180° C. until no more water was distilled from the reaction mixture.

The concentration of carboxyl groups was monitored by ASTM D 465. At the end of the process the residual concentration of carboxyl groups was equal to the concentration of the DMPA carboxyls.

The produced material was an amber highly viscous (200,000 cPs) liquid.

Example 5

Production of Polysulfide-Containing Amidoamine from the Carboxyl-Terminated poly(thioester)

To the product from the Example 1 without isolation or cooling was added N-aminoethylpiperazine (AEP, CAS number 140-31-8, Huntsman Corp. or Air Products and Chemicals, Inc) in the amount of 1.05 mol AEP per one mol of carboxyl. Assuming the targeted acid number of 83.58 mg KOH/g was reached in the first stage, the ratio is 20.4 parts of AEP per 100 parts of produced polyester.

A typical second stage reaction time is 2–3 hours at 155–160° C. under atmospheric pressure. After reaching the targeted amine number, which for this product is 71.2 mg KOH/g, the reactor pressure was reduced to at least 10 mm Hg. to distill off the water produced in the second stage reaction. The temperature during the vacuum period is maintained at 155–160° C.

For process control in this stage the amine number is monitored by ASTM D 2073.

The process ends when the amine number approaches the targeted amine number and no more water was being removed under vacuum.

The produced material was a brown semi-solid substance with a melting range 40–50° C. that was soluble in conventional amidoamines and phenylalkylamines.

Example 6

Production of Polysulfide-Containing Isocyanate Prepolymer with Terminal Isocyanate Groups from Hydroxyl-Terminated poly(thioester)

400 g of poly(thioester) from Example 2 were melted at 60° C. and mixed with 15 g 3 ST Zeochem Purmol Zeolite powder (produced by Zeochem, Louisville, Ky.) to remove traces of water. The mixture was later combined in a reaction vessel with 234 g of isophorone diisocyanate (Vestanat® IPDI, Degussa Corp., CAS # 4098-71-9) (molar ratio 1:2.05). The reaction mixture was heated to 90° C. and agitated for 3 hrs under argon flow.

The concentration of isocyanate groups was monitored by ASTM D 2572-97. At the end of the process the concentration of isocyanate groups was 2.4 N, which is equal to half of the initial concentration of isocyanate groups.

The produced material was a whitish opaque very viscous (150,000 cPs) liquid.

Example 7

Production of Polysulfide-Containing Isocyanate Prepolymer from Hydroxyl-Terminated poly(thioester)

445 g of poly(thioester) from Example 3 were melted at 60° C. and mixed with 15 g 3 ST Zeochem Purmol Zeolite powder (produced by Zeochem, Louisville, Ky.) to remove traces of water. The produced mixture was combined in a reaction vessel with 372 g of methylene-bis(4-cyclohexyl-isocyanate) (Desmodur W, Bayer Corp., CAS # 5124-30-1) and heated to 90° C. and stirred for 1 hr, under argon flow. 95.2 g of dimethylolpropionic acid (DMPA, GEO Specialty Chemicals, CAS # 4767-03-7), 200 g of N-methylpyrrolidinone (NMP BASF, CAS # 872-50-4) and 36 g of triethylamine (TEA, JT Baker, CAS #121-44-8) were added to the reaction mixture. The temperature was reduced to 70° C. and the reaction mixture was mixed at this temperature for 1 hour under argon.

The concentration of isocyanate groups was monitored by ASTM D 2572-97. At the end of the process the concentration of isocyanate groups was 0.68 N, which exactly equaled the calculated concentration of terminal isocyanate groups in the produced prepolymer with pendant carboxyl groups inhibited from reaction by the triethylamine.

The produced material was a whitish viscous liquid with viscosity of approximately 70,000 cPs.

It is evident from the above results that the subject compounds can be readily prepared in good yield under convenient conditions. The subject monomers provide desirable properties to a large number of products enhancing the properties of products prepared from conventional monomers. By replacing all or a portion of diols or dibasic acids used in making condensation polymers, the resulting products have improved physical and chemical characteristics. By modifying the subject monomers with addition polymerizable monomers, the properties of the resulting polymeric product are similarly enhanced.

The references, articles, patent applications and patents, described throughout this specification are fully incorporated by reference, as if fully disclosed in their entirety herein.

Having now fully described the invention, it will be apparent to one of ordinary skill in the art that many changes and modifications can be made thereto without departing from the spirit or scope of the invention as set forth herein.

What is claimed is:

1. A composition of the formula:

(a) $H-F_m-O-(CH_2)_2-S_n-(CH_2)_2-O-H$; or (b) $H-Z-A-O-(CH_2)_2-S_n-(CH_2)_2F^1_{(m+1)}-O-A-Z^1-H$, wherein C, O, H and S have their normal meaning of carbon, oxygen and sulfur;

n is at least 2 and not more than about 8;

F is of the formula $-O-(CH_2)_2-S_n-(CH_2)_2-O-A-$;

$F^1$ is of the formula $-O-A-O-(CH_2)_2-S_n-(CH_2)_2-$;

m is at least 1;

Z and $Z^1$ are the same or different and are oxy or amino; and

A is a fatty acid dimer residue.

* * * * *

UNITED STATES PATENT AND TRADEMARK OFFICE
CERTIFICATE OF CORRECTION

PATENT NO. : 7,087,708 B2
APPLICATION NO. : 10/826216
DATED : August 8, 2006
INVENTOR(S) : Leonid Rappoport et al.

It is certified that error appears in the above-identified patent and that said Letters Patent is hereby corrected as shown below:

Column 2, line 64, insert the following paragraph:

-- Each product includes a monomer unit with the following formula:
$$-ORS_nR^1OA- \text{ or } -OAOR^1S_nR-$$
wherein:

O and S have their normal meaning of oxygen and sulfur;

n is at least 2 and not more than about 8, usually not more than about 4, generally ranging from 2-4, more usually from 2-3;

R and $R^1$ are the same or different and are organic divalent radicals, usually aliphatic and more usually hydrocarbon, saturated or unsaturated, straight or branched chain, generally R and $R^1$ having from 2 to 20, more usually 2 to 12 carbon atoms, wherein the total number of carbon atoms for R and $R^1$ will be in the range of about 4 to 40, usually 4 to 24 carbon atoms; and A is the residue of an organic dibasic carboxylic acid (lacking the two hydroxyl oxygens set forth in the formula) having from at least one carbon atom and not more than about 60 carbon atoms, generally from about 2 to 60, more usually about 2 to 40, frequently about 2 to 12, and conveniently about 2 to 6 carbon atoms, for acids formed by other than dimerization of two monobasic carboxylic acids and from about 24 to 40 carbon atoms for fatty acid dimers. --

Column 5, line 2, replace "f is the group $-ORS_nR^1-$;" with -- f is the group $-ORS_nR^1OA-$; --

Signed and Sealed this
Third Day of July, 2012

David J. Kappos
*Director of the United States Patent and Trademark Office*